United States Patent
Prodic et al.

(10) Patent No.: US 8,077,490 B1
(45) Date of Patent: *Dec. 13, 2011

(54) LIMIT-CYCLE OSCILLATION (LCO) GENERATION BY ALTERING A DIGITAL TRANSFER FUNCTION OF A FEEDBACK LOOP ELEMENT

(75) Inventors: Aleksandar Prodic, Toronto (CA); Zhenyu Zhao, Toronto (CA)

(73) Assignee: Maxim Integrated Products, Inc., Sunnyvale, CA (US)

( * ) Notice: Subject to any disclaimer, the term of this patent is extended or adjusted under 35 U.S.C. 154(b) by 495 days.

This patent is subject to a terminal disclaimer.

(21) Appl. No.: 12/363,875

(22) Filed: Feb. 2, 2009

Related U.S. Application Data (63) Continuation-in-part of application No. 12/107,843, filed on Apr. 23, 2008, now Pat. No. 7,586,767, which is a continuation of application No. 11/687,619, filed on Mar. 16, 2007, now abandoned.

(51) Int. Cl.
*H02J 1/10* (2006.01)
(52) U.S. Cl. ............. 363/65; 363/87; 323/282; 700/297
(58) Field of Classification Search .................. 323/222, 323/267, 271, 282–288; 363/65, 87, 89, 363/21.01, 129; 700/297, 298
See application file for complete search history.

(56) References Cited

U.S. PATENT DOCUMENTS

| | | | |
|---|---|---|---|
| 4,586,121 A | 4/1986 | Gilliam | |
| 5,371,666 A | 12/1994 | Miller | |
| 5,600,234 A | 2/1997 | Hastings et al. | |
| 6,104,968 A | 8/2000 | Ananth | |
| 6,304,460 B1 * | 10/2001 | Cuk | 363/16 |
| 6,366,062 B2 | 4/2002 | Baretich et al. | |
| 7,157,888 B2 * | 1/2007 | Chen et al. | 323/224 |
| 7,166,992 B2 | 1/2007 | Kudo et al. | |
| 7,315,157 B2 | 1/2008 | Chapuis | |
| 7,443,147 B2 * | 10/2008 | Kasai et al. | 323/259 |
| 7,595,686 B2 * | 9/2009 | Maksimovic et al. | 327/540 |

OTHER PUBLICATIONS

Yao, Kaiwei, "High-Frequency and High-Performance VRM Design for the Next Generations of Processors", PhD Dissertation, Virginia Polytechnic Institute and State University, Apr. 14, 2004, Blacksburg, VA.
Yao, et al., "Control Bandwidth and Transient Response of Buck Converters", IEEE Proceedings of the 2002 Power Electronics Specialists Conference, Jun. 2002 pp. 137-142, Blacksburg, VA.
Qiu, et al., "The Multi-Frequency Small-Signal Model for Buck and Multiphase Interleaving Buck Converters", IEEE Applied Power Electronics Conference and Exposition (APEC) 2005, pp. 392-398, Austin, Texas.
Shirazi, et al. "Self-Tuning Point-of-Load Controller", Colorado Power Electronics Center Annual Meeting, Nov. 2006, Boulder CO.

(Continued)

*Primary Examiner* — Rajnikant Patel
(74) *Attorney, Agent, or Firm* — Mitch Harris, Attorney at Law, LLC (57) ABSTRACT

Limit-cycle oscillation (LCO) generation by altering a digital transfer function of a feedback loop element provides a controllable method and apparatus for generating LCOs within a switch-mode power supply (SMPS). Measurements of the LCO characteristics can then be used to determine characteristics of the SMPS and/or determine proper compensation schemes. At least a zero error code of the feedback loop element is removed, causing the control value to oscillate between at least two values. Additional codes may be progressively removed until an LCO is detected, in order to ensure LCO generation with minimum disruption of SMPS operation. An analog-to-digital converter (ADC) that converts an output voltage or current to a control value may be used to generate an LCO by removing one or more output codes to alter its transfer function. Alternatively, a quantization step of the pulse-width modulator or other modulator may be increased to temporarily cause LCOs.

24 Claims, 7 Drawing Sheets

OTHER PUBLICATIONS

Shirazi, et al., "Autotuning Techniques for Digitally-Controlled Point-of-Load Controllers with Wide Range of Capacitive Loads", Proceedings of the IEEE APEC, p. 14-20, Feb. 2007, Anaheim, CA.

Corradini, et al., "Robust Relay-Feedback Based Autotuning for DC-DC Converters", Proceedings of the IEEE APEC, Feb. 2007, p. 2196-2202, Anaheim, CA.

Kelly, et al., "A Self-Compensating Adaptive Digital Regulator for Switching Converters Based on Linear Prediction" pp. 712-718, Proceedings of the IEEE APEC, Mar. 2006, Anaheim, CA.

Hagen, et al., "Digital Control Measures In-System Response", Power Electronics Technology, Nov. 2006, Overland Park, KS.

Stefanutti, et al., "Autotuning of Digitally-Controlled DC-DC Converters Based on Relay Feedback", IEEE Trans on Power Electronics, vol. 22, No. 1, Jan. 2007.

Office Action in U.S. Appl. No. 12/107,832 mailed on Oct. 27, 2008.

Office Action in U.S. Appl. No. 12/107,843 mailed on Dec. 16, 2008.

* cited by examiner

LIMIT-CYCLE OSCILLATION (LCO) GENERATION BY ALTERING A DIGITAL TRANSFER FUNCTION OF A FEEDBACK LOOP ELEMENT

The present application is a Continuation-in-Part of U.S. patent application Ser. No. 12/107,843 filed on Apr. 23, 2008 now U.S. Pat. No. 7,586,767, which is a Continuation of U.S. patent application Ser. No. 11/687,619, filed on Mar. 16, 2007 and abandoned on Jun. 24, 2008. The present application is further related to U.S. patent application Ser. No. 12/107,832 filed on Apr. 23, 2008, which is a Continuation of U.S. patent application Ser. No. 11/687,627, filed on Mar. 16, 2007 and abandoned on May 14, 2008. The disclosure of each of the above-referenced U.S. Patent Applications is incorporated herein by reference.

BACKGROUND OF THE INVENTION

1. Field of the Invention

The present invention relates generally to techniques for generating limit-cycle oscillations (LCOs) in switch-mode power supplies (SMPSs), and more specifically, to a switch-mode power supply in which the transfer function of a digital element in the control feedback loop of the SMPS is temporarily altered in order to generate an LCO.

2. Background of the Invention

Switching power converters, referred to as switch-mode power supplies (SMPSs) are currently in widespread use for applications such as systems power supplies, AC power inverters, as well as localized power supplies, also known as point-of-load (PoL) supplies, such as voltage regulator modules (VRMs) for microprocessors. In a SMPS, one or more magnetic storage elements such as inductors or transformers are energized and interrupted by a switching circuit and the stored energy is typically periodically transferred to one or more capacitive storage elements. The output voltage or output current (or an analog of the output voltage/current) of the SMPS is sensed by a sensing circuit and used to control the switching circuit so that voltage or current regulation is provided over a variety of input voltage, output load and temperature variation ranges.

A compensation circuit or "compensator" is provided in the feedback and/or feed-forward paths of the converter between the sensing circuit and the switching circuit and sets the control response of SMPS to the sensed output voltage and/or current. The compensator modifies the closed-loop response of the converter response to ensure that the converter is stable, i.e., the output is well-behaved, and to ensure desired operating conditions. The crossover bandwidth is the bandwidth at which the converter loop gain becomes unity, and is a function of the reactance and resistance of the above-mentioned inductive and capacitive storage element(s), as well as the open loop gain of the converter circuits and the compensator. The crossover bandwidth is set to a frequency low enough that the phase shift around the converter loop is less than 180 degrees by a phase margin.

Since the reactance and resistance values of the capacitors and inductors used in SMPS can vary widely both from device-to-device and over temperature and device aging, a very conservative approach to compensation must typically be taken. Device-to-device variations can be compensated-for by production tuning, but at considerable cost and potentially high rejection rates if a conservative design is not chosen. Such conservative designs typically require capacitors having at least 40% greater capacitance than would be necessary for an optimally-tuned SMPS. The capacitors are typically the most expensive components of the SMPS and also one of the largest space and weight consumers, particularly for a high-frequency SMPS, in which the transformers and/or inductors can be made very small.

Even if a particular set of storage element parameters is known for an off-the-shelf SMPS design, the connected load, which also might be partially or fully capacitive, will change the characteristics of SMPS operation so that an ideal response is not possible for all applications. For example, when an SMPS is connected to digital equipment, the power supply distribution buses typically have large amounts of capacitance provided for decoupling and local energy storage to reduce the amplitude of transient voltage due to digital switching. The amount of capacitance will vary from application to application and the esr of the external capacitance and for some capacitor types (e.g., aluminum electrolytic capacitors) the capacitance itself will vary widely with operating temperature.

The design of such an "ideal" converter is further exacerbated for manufacturers of controller integrated circuits (ICs) intended for use in off-the-shelf SMPSs or use by other manufacturers in on-board SMPS designs that form part of a larger sub-system. The controller ICs must be able to implement SMPS compensators not only in varying applications, but for SMPS designs with wide ranges of storage element reactances and resistances.

The above-incorporated Parent U.S. Patent Application, as well as the other above-referenced related U.S. Patent Applications disclose and claim particular techniques for extracting component parameters of a particular SMPS and determining compensation for the particular SMPS without disrupting power supply characteristics at the input and output of the power supply. However, improvements are desirable to any technique that can provide information about SMPS component parameters and determine compensation responses that will yield desired operation, while avoiding disruption of the output of the SMPS and the power supply input source.

Therefore, it would be desirable to provide an improved method and system for determining the characteristic response of an SMPS. It would further be desirable to provide such a method and system that introduces little or no interference with the SMPS output and line input.

SUMMARY OF THE INVENTION

The above stated objectives, as well as others, are achieved in a method and system for generating limit-cycle oscillations (LCOs) in a switched-mode-power supply (SMPS), which are then measured and used to determine SMPS parameters and/or compensation values. The method is a method of operation of the system, which may be integrated in a SMPS controller integrated circuit (IC).

The system includes a control circuit that temporarily alters or replaces a transfer function of a digital element, including analog/digital elements such as an analog-to-digital converter (ADC), in an SMPS control feedback loop in order to cause an LCO. The presence or absence of the LCO may be detected, and the loop transfer function progressively changed until an LCO occurs or a final LCO failure indication is generated. The loop response is such that the LCOs are deliberately induced at a frequency indicative of the parameters of the SMPS, e.g., the frequency of resonance of the magnetic energy storage element of the SMPS with the output capacitance of the SMPS. The loop gain and/or frequency response of the loop may also be adjusted to ensure that LCO-supporting conditions are present.

The alteration of the transfer function may be alteration of the output codes provided from an ADC that measures an output voltage or current of the SMPS and provides control feedback to the modulator that controls the SMPS. In response to a control signal, one or more codes may be removed from or altered in the ADC response in order to cause an LCO in the loop. The eliminated/altered code may be a single "zero" code that represents a desired operating point of the SMPS in normal (non-LCO-generating) operation. Alternatively, the codes may be eliminated by disabling/ignoring one or more least significant bits of the ADC. As another alternative, the resolution or transfer function of the modulator or another digital feedback element may be altered in order to generate an LCO, or one of the blocks (including the ADC) may be replaced with another block having a different transfer function, for example, the ADC may be replaced with a zero-hysteresis comparator having a decision point centered around the zero-error condition, so that the zero-error condition is not supported in the loop. In any of the above techniques, the transfer function of the loop may be progressively altered until an LCO is generated or a limit of such alteration is reached. For example, an upper limit may be set on removal of codes from the transfer function such that a maximum output voltage/current error level is not exceeded.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses switch-mode power supplies (SMPSs)/switching power converters and methods of operation of SMPSs that generate limit-cycle oscillations (LCOs) in the converter loop in order to measure characteristics of the LCOs, which, in turn, are used to determine characteristics of the SMPS, e.g., the loop response, loop stability and/or parameters of components within the SMPS. The above-incorporated parent and other U.S. Patent Applications disclose LCO generation and response/parameter measurement, including generation of LCOs by reduction in the resolution of a pulse-width modulator (PWM). The present invention extends the possibilities for controlled LCO causation to any digital portion of the feedback loop that controls the switching circuit of the SMPS, and includes a variety of means for changing the response or transfer function of one or more of the feedback elements having a digital signal flow to temporarily alter the loop response.

In general, an LCO is caused in a digital control/feedback system any time a quantization step of the control mechanism is larger than a quantization step of the feedback sensing mechanism or other part of the feedback path, as referred to a single point in the control loop. An LCO will also be caused if there is no zero-error state available in the control loop, as will occur if a zero-error code is removed from one of the digital blocks in the loop. Under such conditions, the control variable values around the loop will necessarily alternate between two (or more) values, which due to the larger quantization step of the feedback path or lack of a zero-error value, cannot command single steady-state value at the input to the control mechanism, because the feedback loop cannot report a zero-error condition to the control mechanism.

Figure 1:
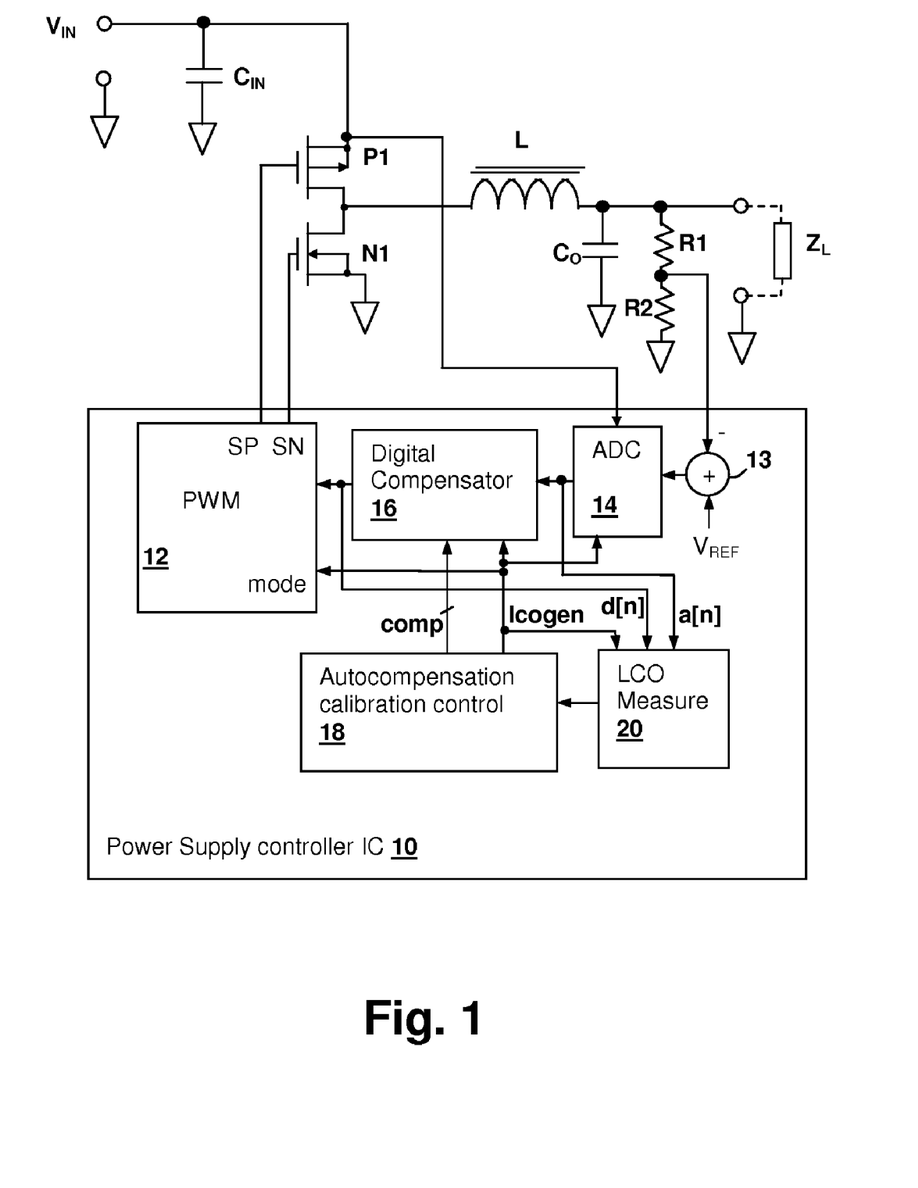
FIG. 1 is a schematic diagram depicting an SMPS in accordance with an embodiment of the invention.

Referring now to the Figures, and in particular to FIG. 1, an SMPS in accordance with an embodiment of the present invention is shown. The depicted converter is a DC-to-DC buck converter, but it is understood that the techniques of the present invention apply to SMPSs of other topologies and input/output voltage types, as SMPSs in general have feedback or feed-forward compensators that remove the low frequency resonances due to the storage elements and then attenuate the gain of the converter above a frequency at which: 1) performance cannot be improved by extending the response, 2) performance cannot be improved without introducing instability, or 3) the loop bandwidth would approach the switching frequency of the SMPS.

An input voltage $V_{IN}$ is provided on a pair of input terminals and across capacitor $C_{IN}$. A switching circuit including transistors P1 and N1 switches a first terminal of an inductor L between the terminal connected to input voltage $V_{IN}$ and ground. The second terminal of inductor L is connected to an output capacitance $C_o$, which may be a single capacitor $C_o$ or a capacitor bank. Capacitor $C_o$ is coupled to terminals adapted for connection to a load, represented in the Figure by an impedance $Z_L$.

Power supply controller integrated circuit (IC) 10 operates the switching circuit formed by transistors P1 and N1 in accordance with a control loop provided by analog-to-digital converter (ADC) 14 and digital compensator 16 that operates a pulse-width modulator (PWM) 12. PWM 12 is exemplified by a digital pulse-width modulator (DPWM), but it is understood that other modulator types such as analog PWMs and digital pulse frequency modulators (DPFM) can be used in alternative embodiments of the present invention. Analog-to-digital converter 14 generally provides information to digital compensator 16 regarding output voltage, input voltage and output current, but in a particular embodiment, not all of the above-mentioned input variables may be present. At a minimum, for voltage-mode control, at least the output voltage is measured by ADC 14 and for current-mode control, generally the inductor or a switching transistor current will be measured as well, unless a technique to extrapolate the output current from output voltage variation is used. An error summing circuit 13, subtracts the output voltage across impedance $Z_L$ from a reference voltage $V_{REF}$, to provide an error voltage to ADC 14. Alternatively, the output voltage may be measured directly by ADC 14.

An auto-compensation calibration control 18 triggers LCO measurement, which may be at start-up, periodically, or in response to detected operating conditions, an external command or a detected event such as a temperature change. Signal lcogen is asserted during LCO generation and measurement, and is provided to at least one digital element of the SMPS feedback control loop, e.g., ADC 14, digital compensator 16 or PWM 12, in the exemplary SMPS. Upon receiving signal lcogen, the transfer function of the digital element is altered, or the digital element is replaced with another element, in order to set up an LCO condition in the control loop. An LCO measurement unit 20 also receives signal lcogen and detects an LCO generated by the altered control loop, determining at least a frequency/period of the LCO and optionally, the LCO amplitude. LCO measurement unit 20 receives an output a[n] of ADC 14, an output d[n] of digital compensator 16, or both, and uses the information to determine the frequency (and optionally the amplitude) of the LCOs. The primary parameter of the SMPS that is used to control digital compensator 16 is the characteristic frequency response of the output LC filter of the converter, which is determined by the frequency measured by LCO measurement unit 20.

As mentioned above, auto-compensation calibration control block 18 provides signal lcogen to one or more digital elements within the feedback path extending from sense resistor $R_{SO}$, through ADC 14, digital compensator 16 and to PWM 12. Signal lcogen is a control signal that commands the digital element(s) to alter the response of the feedback path, generally by removing or altering at least one digital code of the transfer function for at least one of the feedback path digital elements. Alternatively, the digital element may be replaced with an alternative block in response to signal lcogen to accomplish the requisite change in the overall control loop transfer function. The digital code(s) removed from or altered in the transfer function include at least the zero-error code, so that PWM 12 will continually increment and decrement the PWM 12 output duty cycle, which corresponds to the LCO condition. Signal lcogen is asserted temporarily, which will generally cause LCOs during the assertion of signal lcogen. The lcogen signal may be a multi-bit signal corresponding to multiple levels of transfer function alteration, and the level of alteration may be increased progressively until LCO measurement circuit 20 has completed a successful LCO measurement.

In particular, while the circuit depicted in FIG. 1 illustrates application of control signal lcogen to ADC 14, digital compensator 16 and/or PWM 12, the transfer function modification may be performed in any of the digital elements (including interconnects) in the feedback path, or may be performed by replacing one of the digital elements with another. In a particular embodiment of the present invention, control signal lcogen is applied to ADC 14, and changes the input/output transfer function of ADC 14 to change the transfer function of ADC 14 by removing one or more codes, including a zero-error code. The code(s) removed are around the steady-state nominal operating point of the converter, e.g., at the nominal sensed output error voltage or current level that provides input to the feedback loop, or the nominal output voltage or current if ADC 14 if error summing circuit 13 is not used, so that the removal of the code(s) causes a response that can generate an LCO, because there is no condition that can satisfy a steady-state zero-error condition around the feedback loop. In the depicted embodiment ADC 14 is configured to measure a difference between the nominal sensed output (or alternatively a current level) and a reference level as produced by error summing circuit 13, in which case the zero-error code of ADC 14 is understood to be a true zero input value code, which is removed from the transfer function of ADC 14 in response to assertion of control signal lcogen. As mentioned above, if an LCO is not detected in response to removal of code(s) from the transfer function of ADC 14, then the transfer function can be further modified by progressively removing an additional code or codes until an LCO occurs, a hardware limit is reached with respect to the loop alteration, or the loop response has been altered to a degree that unacceptable SMPS operation can be expected.

LCO measurement circuit 20 measures the amplitude and/or frequency of the LCOs and provides information to auto-compensation calibration and control block 18, which then sets the response of digital compensator 16 according to compensation control signal(s) comp. The response of digital compensator 16 may be set using a variety of methods, including a set of look-up tables that determine the compensation value from the measured LCO response or parameter values extracted from the LCO response, a combinational logic or direct look-up table that determines the compensation values directly from the LCO frequency or output code sequences from ADC 14, or the coefficients of digital compensator 16 may be computed from results of an LCO measurement. In some embodiments of the invention, a processor core implements digital compensator 16, auto-compensation calibration control block 18, and optionally LCO measurement block 20 and PWM 12. In such embodiments, program code within a memory coupled to the processor core provides the functionality of digital compensator and the other included blocks according to program instructions for carrying out the methods of the present invention. For example, single-chip microcontrollers are available that incorporate PWM units and ADCs. Such a microcontroller can be used to implement the functionality of power supply controller IC 10 without requiring modification, in particular if the output voltage is measured directly by ADC 14, or an error summing circuit 13 and reference voltage source are provided within the microcontroller.

The combination of LCO measurement block 20 and auto-compensation calibration control block 18 may act as a parameter extraction system that extracts parameters of the SMPS and tunes digital compensator 16 to achieve the compensation goals, e.g., optimized transient response, minimized transient amplitude or predetermined/maximized phase/gain margins. The resulting control of compensator 16 as against component, environmental and load variations by virtue of the LCO measurements permits use of smaller capacitance values for $C_{IN}$ and $C_O$ than would otherwise need to be specified to accommodate such variation in parameters. Other parameters may be included in the tuning algorithm and computed by auto-compensation calibration control block 18 from information provided by ADC 14, such as actual inductance, capacitance and capacitor esr determined from input voltage, output voltage and current measurements.

In order to obtain an LCO at the resonant frequency of the converter output filter, a phase shift of 180 degrees is needed at the resonant frequency. In a buck converter, since the phase shift provided by the LC output filter is 90 degrees at the resonant frequency, an additional 90 degrees of phase shift is needed in the feedback loop commencing at a frequency that is lower than any expected resonant frequency of the filter, so that when the phase shift of the filter reaches 90 degrees, the total phase shift around the feedback loop will reach 180 degrees. In order to provide the 90 degree phase shift, signal lcogen causes digital compensator 16 to assume a response of a simple integrator, or alternatively another known stable compensator having a 90 degree total phase shift. As the resonant frequency of practical converters can be expected to be above a specific frequency, it is possible to configure the loop elements in such that the loop elements contribute 90 degrees of phase shift below the resonant frequency of the LC output filter. To determine the gain of the integrator, the loop gain must be taken into account and the gain factor due to the input voltage may also need to be considered. The overall gain must be maintained below unity to provide stable operation during the LCO measurements. For particular converter designs the output voltage/input voltage gain is measured during operation, or known a priori and provided or calculated as a programmed parameter for the loop. Once the SMPS is started using the integrator response, the LCO measurements can be performed to determined the desired compensation for normal operation of the SMPS. However, after startup, a wider bandwidth of the compensator response can be used, since the loop parameters that determine the gain and phase response are known. The compensation during LCO measurement can be chosen based on a range of known possible responses such that an LCO will be supported and thereby provide useful information about the SMPS. Other compensation types can be used besides integral responses, with a consequent adjustment to the parameter extraction models so that the differing response is taken into account. Startup LCO measurement may be performed as the voltage on the output of the SMPS is still approaching its steady-state value. Once stable (but not necessarily steady-state) operation is determined, the LCO measurement can be used to extract the SMPS parameters and then a desired compensating response selected/computed and applied before the SMPS comes on line. If a power ready indication is provided by the SMPS, the LCO parameter extraction can be performed before the conditions for the power ready indication are complete, or the power ready signal may be qualified by completion of the LCO measurement and application of the desired compensation.

Figure 2A:
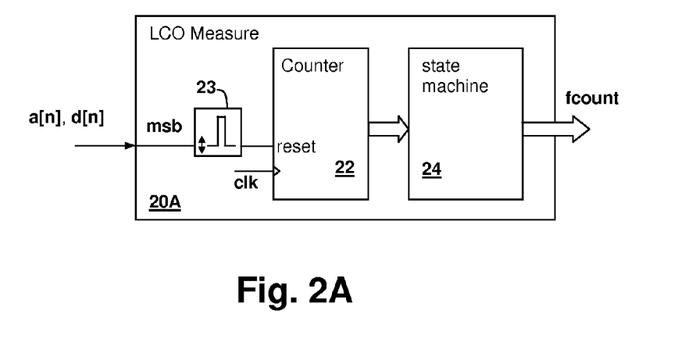
FIGS. 2A-2B are schematic diagrams depicting LCO measurement circuits that may be used to implement LCO Measurement circuit 20 of FIG. 1, in accordance with embodiments of the invention.
Figure 2B:
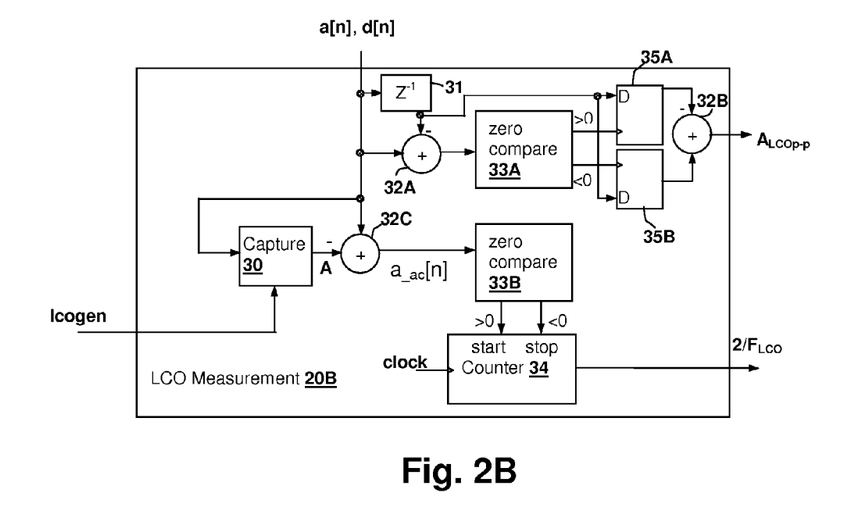

Referring now to FIGS. 2A-2B, details of exemplary embodiments of LCO measurement circuit 20 of FIG. 1 are depicted. During LCO measurement, LCO measurement block 20 of FIG. 1 may determine an indication of the frequency (and optionally the amplitude) of LCOs using a relatively simple digital circuits, as shown in FIGS. 2A and 2B. The amplitude of the LCO is not necessarily required to determine a compensation scheme that provides a desired or suitable response, but information obtained from the LCO amplitude can be used to determine effects or values of other quantities of interest, including component parameters such as output capacitor ESR and damping in the overall SMPS converter response. In LCO measurement circuit 20A of FIG. 2A, the most significant bit (sign bit) msb of the output of ADC 14 $a[n]$ or, alternatively the sign of the output $d[n]$ of digital compensator 16, is edge-detected by a edge detector 23 and resets a counter 22 is clocked by a clock signal clk. A state machine 24 observes the total value of the output of counter 22 and determines the frequency of the LCO from multiple half-periods of the LCO, providing output fcount to auto-compensation calibration control 18 of FIG. 1. Whether output $a[n]$ of ADC 14 or output $d[n]$ of digital compensator 16 is used, depends on their relative signal-to-noise ratios, which depends on the compensator response and the current operating conditions.

Referring now to FIG. 2B, an LCO measurement circuit 20B, in accordance with another embodiment of the present invention provides LCO frequency and amplitude information. The maximum amplitude of the LCOs is taken as the sample of ADC output $a[n]$ (or alternatively $d[n]$, but described further below as only $a[n]$ for clarity) immediately prior to a first change in sign of the first difference $a[n]-a[n-1]$ of control input $a[n]$. The minimum amplitude of the LCOs is taken as the sample of ADC output $a[n]$ immediately prior to a second change in sign of the first difference $a[n]-a[n-1]$ of ADC output $a[n]$. The first difference $a[n]-a[n-1]$ is computed by a combiner 32A from ADC output input $a[n]$ and the output of a unit delay 31 that provides value $a[n-1]$. A zero comparison circuit provides outputs indicating that first difference $a[n]-a[n-1]$ is greater than zero (>0) or less than zero (<0), and are used to activate positive edge-triggered latches 35A and 35B to store the output $a[n-1]$ of unit delay 31 in response to the detection of the first and second sign change of first difference $a[n]-a[n-1]$, respectively. A combiner 36B subtracts the captured minimum value of $a[n]$ stored in latch 35B from the captured maximum value of $a[n]$ stored in latch 35A to provide an indication of peak-to-peak amplitude of the LCOs. The discrete differences above correspond to the derivative of the LCO waveform, and other techniques for locating the maxima and minima according to differentiating the waveform may be alternatively applied.

To provide an indication of frequency of the LCOs, a counter 34 is clocked at the sample rate, which is higher than the LCO period by at least a factor of two in order to meet the Nyquist criterion, and is started and stopped by detecting the zero transitions of an AC portion of $a[n]$, as determined by a zero comparison circuit 33B. In order to measure only the changes from the steady state value due to the LCOs, the steady-state value of ADC output $a[n]$ is removed from the measurement. ADC output $a[n]$ is captured by a capture circuit 30 prior to the generation of LCOs as signal lcogen is asserted, and represents a steady state value A of the error in the output of the SMPS in the absence of LCOs. Steady state value A is subtracted from $a[n]$ by a combiner 32C that generates an "AC" version of $a[n]$ labeled $a_{ac}[n]$. A zero comparison circuit 33B receives $a_{ac}[n]$ and starts/stops counter 34, so that a time between zero crossings of $a_{ac}[n]$ is produced as an indication of the length of a half-period of the LCOs ($2/F_{LCO}$).

The measurement of the frequency, and optionally the amplitude, of the LCOs provides for extraction of parameters of the converter and/or determination of the response of digital compensator 16 needed to achieve the desired loop response of the SMPS. Since the bandwidth of digital compensator 16 is predetermined according to settings during LCO measurement, and in the above example is simplified by using an integrator response of K/s, other parameters of the converter can then be extracted from the measurement results.

Figure 3A:
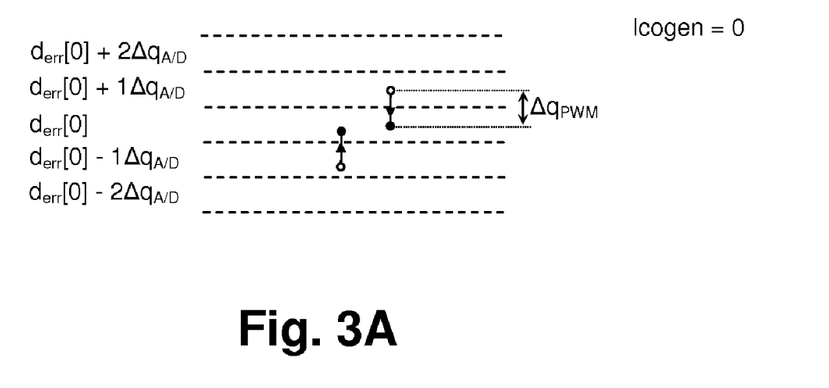
FIGS. 3A-3C are graphs illustrating quantization step changes used to generate LCOs in embodiments of the invention.
Figure 3B:
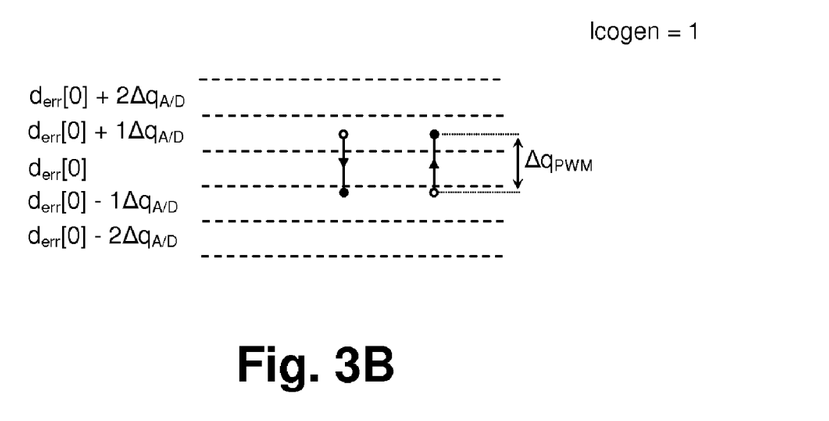
Figure 3C:
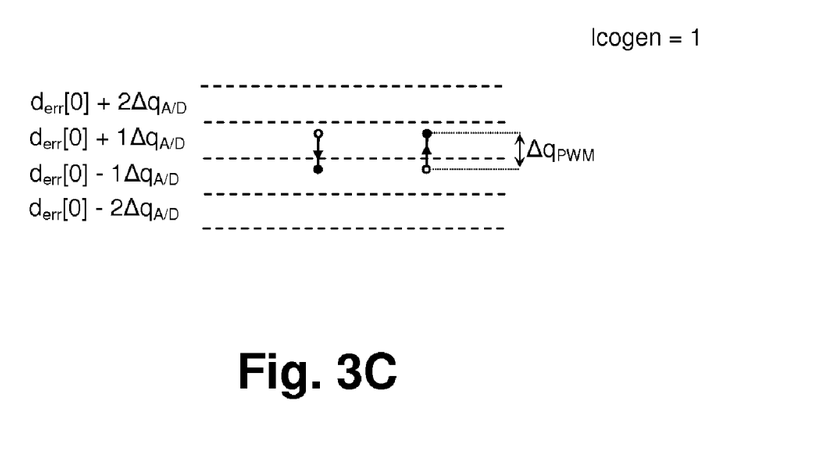

Referring now to FIGS. 3A-3C, changes in the relationship between the quantization step of ADC 14 and PWM 12 in the SMPS of FIG. 1 are shown. The vertical position of the dashed horizontal lines in FIGS. 3A-3C correspond to quantized signal levels at a selected reference point in the SMPS control loop, where the quantization is according to a quantization step of the digital block in which the transfer function is altered in response to signal lcogen (e.g., ADC 14). The reference point may be, for example the input of ADC 14, but alternatively may be another point in the feedback loop. The digital block that has a transfer function altered by asserting signal lcogen is independent of the selected reference point, as a reference point is selected only for the purposes of illustrating relative quantization steps in the feedback loop. The zero-error code is represented by zero-error code $d_{err}[0]$.

In FIG. 3A, normal non-LCO generating operation of ADC 14 is shown (control signal lcogen de-asserted). Each adjacent change in the output code of ADC 14 as illustrated in FIG. 3A corresponds to a level change of quantization step $\Delta q_{A/D}$ which is the quantization step of ADC 14 as referred to a reference node in the feedback loop (e.g., the input of ADC 14). The steps illustrated in the vertical lines of FIG. 3A are single-quanta steps in the control output mechanism of the loop, i.e., the output of PWM 12, which illustrate the quantization step $\Delta q_{PWM}$ of PWM 12, as referred to the same loop reference node. The vertical lines indicate a direction of change in the PWM output duty cycle from the hollow dot end of the lines to the solid dot end of the lines. The lines indicate some changes in value, but under low noise and load/line change environments, the digital signal may assume the zero-error code for long periods of time. In FIG. 3A, $\Delta q_{PWM}$ is less than or equal to $\Delta q_{A/D}$, which is one of the conditions generally needed to ensure that no LCO occurs in the SMPS.

Referring now to FIG. 3B, one technique for generating LCOs is illustrated in accordance with an embodiment of the present invention. In response to assertion of control signal lcogen, the relative size of quantization step $\Delta q_{PWM}$ with respect to quantization step $\Delta q_{A/D}$ has been increased, and as illustrated, the zero-error condition is missed, which, in response will cause the compensator to increment or decrement the PWM output period in an opposite direction, again missing the zero-error condition. In the illustrated example, the lines extend past the entirety of the zero-error condition in each direction, but if one of the values is close to a quantization boundary, then the waveform will oscillate between two adjacent codes. A single step of the output value of PWM 12 resulting from the LCO causes a change in the output of ADC 14, ensuring that an LCO condition will exist as long as control signal lcogen is asserted, provided other necessary conditions are met. Under such conditions, the progressive removal of codes and/or adjustment of transfer function as described above can be followed until the LCO occurs. The relative size of quantization step $\Delta q_{PWM}$ can be increased by reducing the quantization step of ADC 14, or by altering the transfer function of another block in the control loop to reduce the size of the quantization step of ADC 14 relative to the step size of PWM 12, as referred to the same point in the control loop.

Referring now to FIG. 3C, another technique for generating LCOs is illustrated in accordance with another embodiment of the invention. In response to assertion of control signal lcogen, zero-error code $d_{err}[0]$ is removed from the transfer function of ADC 14 (or alternatively another digital block in the control loop). The output value of PWM 12 will alternate between two or more codes and the output of ADC 14 will correspondingly alternate to the two values around absent zero-error code $d_{err}[0]$, since PWM 12 will be driven in the opposite direction as zero-error code $d_{err}[0]$ is crossed, ensuring that an LCO condition will exist as long as control signal lcogen is asserted and other conditions necessary for oscillation are met.

Figure 4A:
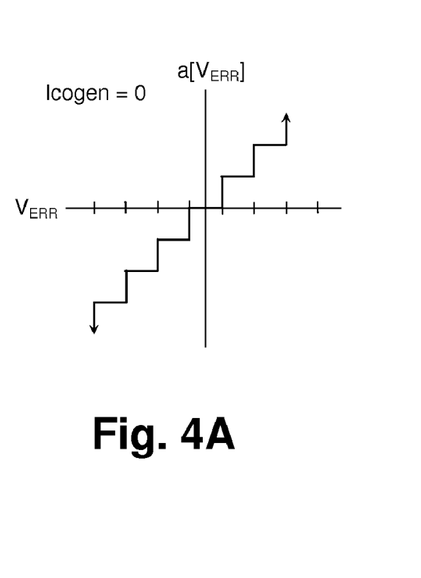
FIGS. 4A-4C are graphs illustrating transfer function alterations in accordance with embodiments of the invention that may be employed within ADC 14 of FIG. 1 to generate LCOs.
Figure 4B:
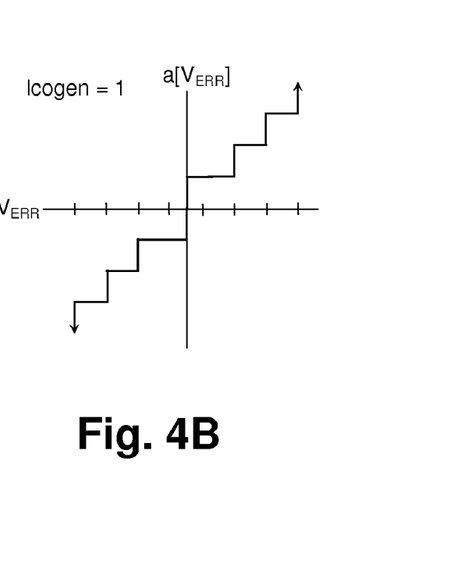
Figure 4C:
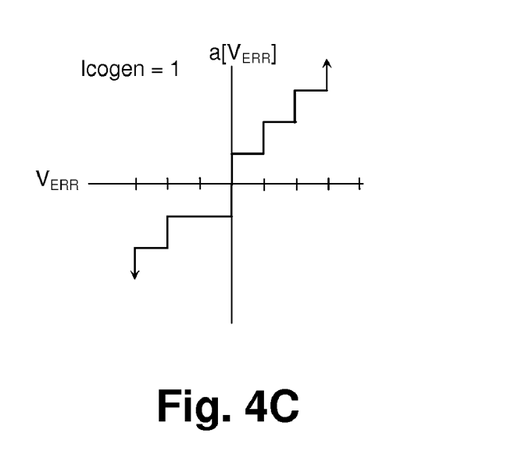

Referring now to FIGS. 4A-4C, changes in the transfer function of ADC 14 (or another digital block having a transfer function altered in response to signal lcogen) are illustrated in accordance with embodiments of the present invention. FIG. 4A illustrates the nominal transfer function, which produces a code $a[V_{ERR}]$ at the output of ADC 14 in response to input error voltage $V_{ERR}$. FIG. 4B illustrates removal of the nominal code $a[0]$ in accordance with an embodiment of the present invention, with ADC 14 generating a next higher code over a positive half of the input voltage range ordinarily assigned to the zero-error code and a next lower code over a negative half of the input voltage range ordinarily assigned to the zero-error code. FIG. 4C illustrates removal of the zero-error code by assigning the entire window for the zero-error code to the next lower value. (The zero-error code could equivalently be assigned to the next higher value.) Any of the above-illustrated transfer function modifications, among others, may be used to cause generate of an LCO in response to signal lcogen.

Figure 5A:
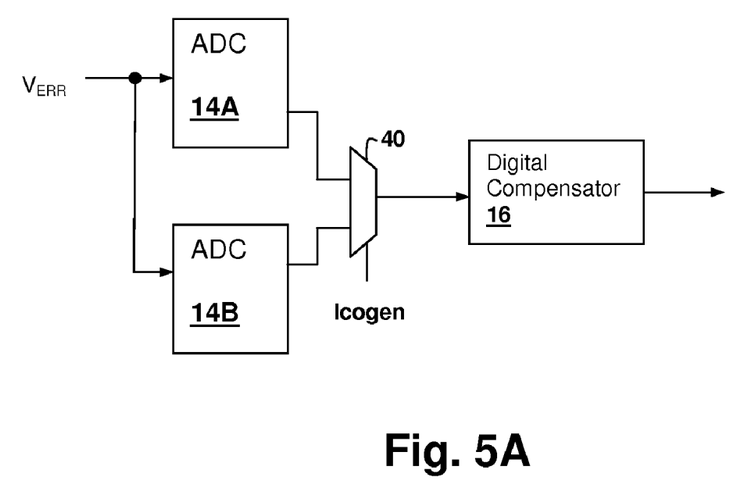
FIGS. 5A-5B are schematic diagrams depicting alternative LCO generation circuits that may be used in auto-compensation calibration control block 18 of FIG. 1, in accordance with embodiments of the invention.
Figure 5B:
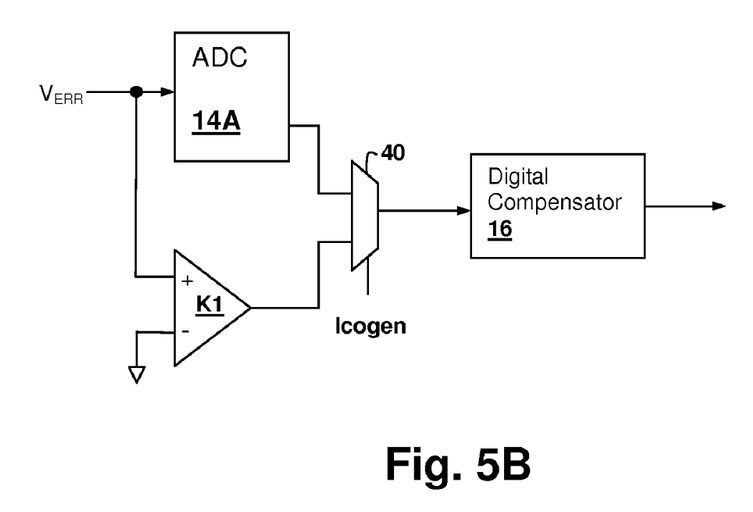

Referring now to FIGS. 5A-5B, alternative LCO-generating transfer function alterations are illustrated in accordance with embodiments of the present invention. Both techniques may be viewed as "block replacement" techniques, in contrast to alteration of the transfer function of an existing digital block within the SMPS feedback loop. FIG. 5A illustrates a circuit in which two different ADC circuits ADC 14A and 14B are exclusively selected via a selector 40, that selects ADC 14A during normal operation and ADC 14B, when signal lcogen is asserted. The gains/code transfer functions of ADC 14A and 14B differ so that ADC 14B in combination with the balance of the feedback control loop meets the criteria for LCO generation, while ADC 14A supports normal operation. The resolution of ADCs 14A and 14B may be the same or may differ, but the quantization step size and/or presence of the zero code differs as between ADCs 14A and 14B as described above with respect to a single ADC 14. FIG. 5B illustrates an example that effectively reduces the resolution of ADC 14B to a single-bit comparator K1, which cannot generate a zero-error code, since the input to digital compensator 18 will be the "sign" (polarity) of error voltage $V_{ERR}$.

Figure 6A:
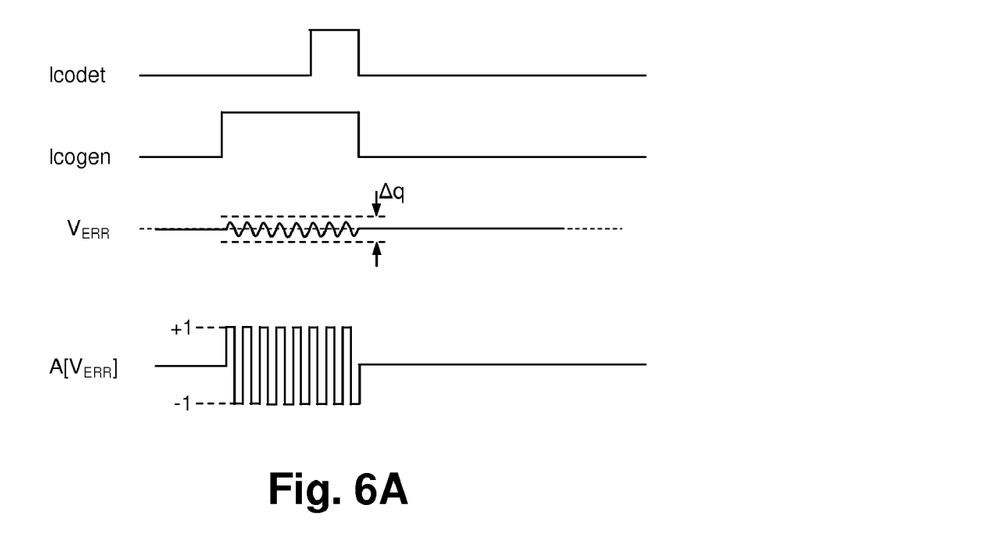
FIGS. 6A and 6B are signal waveform diagrams depicting signals within the circuit of FIG. 1.
Figure 6B:
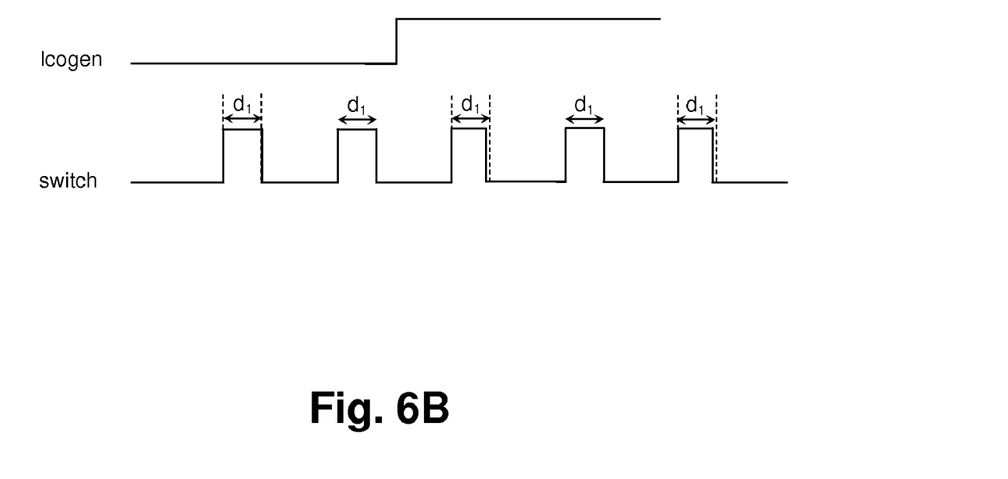

Referring now to FIGS. 6A-6B, waveforms within the circuit of FIG. 1 are illustrated. In FIG. 6A, an LCO generation cycle is illustrated. Signal lcogen is asserted, and error voltage $V_{ERR}$ is shown as a desirably low amplitude LCO occurring in the output voltage of the SMPS. ADC output $A[V_{ERR}]$ is illustrated as alternating between +1 and −1, with the zero-error code removed from ADC 14. Signal lcodet represents an internal signal of auto-compensation calibration control block 18 that indicates that an LCO has been detected after multiple LCO cycles have occurred. FIG. 6B illustrates a repetitive overlay of signal switch corresponding to the output of PWM 12, as may be displayed by an oscilloscope monitoring the switching signals. Before signal lcogen is asserted, signal switch has a nominally constant duty cycle $d_1$ for fixed line/load conditions. When signal lcogen is asserted, the period of signal switch alternates between a period shorter than period d1 and period d1, as shown. Depending on the particular initial conditions and other factors in the loop response, the period of signal switch may instead alternate between a period longer than period d1 and period d1, or may alternate between periods shorter than and longer than period d1. The waveform of FIG. 6B illustrates the stable nature of the LCO, although there is no single stable point of operation due to the absence (or unreachability) of the zero-error condition while signal lcogen is asserted.

Figure 7:
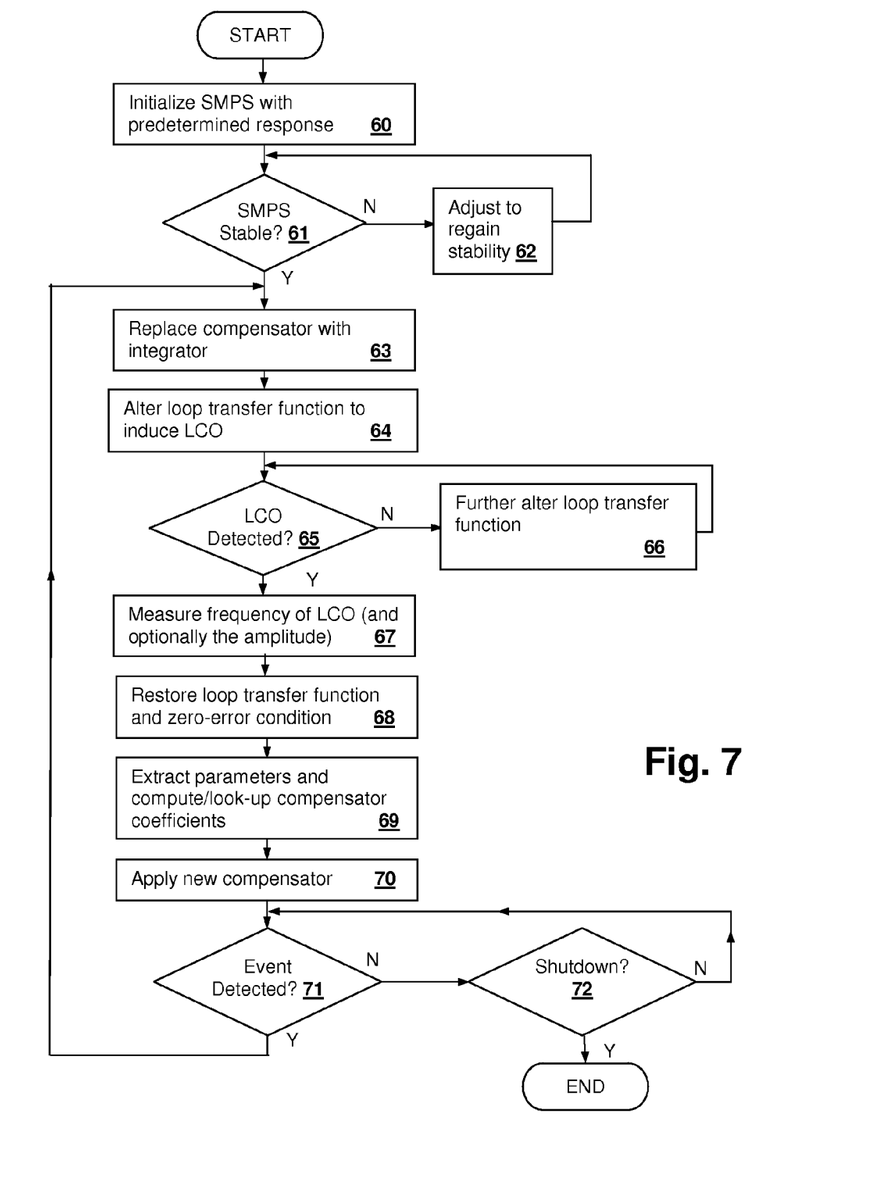
FIG. 7 is a flowchart showing an LCO generation, measurement and auto-compensation method in accordance with an embodiment of the invention.

Referring now to FIG. 7, operation of an auto-tuning method in accordance with an embodiment of the invention is depicted in a flowchart. First, the SMPS is initialized with a predetermined response suitable for the type of converter circuits employed (step 60). If the loop is unstable (decision 61), then the compensation is adjusted to regain (or attain) stability (step 62). After the loop is operating in a steady-state condition (decision 61), the compensator is replaced with an integrator or other response as described in detail above (step 63). The ADC transfer function is then altered to initiate LCO generation (step 64) and if an LCO is not detected (decision 65), then additional codes are removed (step 66). Once an LCO is detected, the frequency of the LCO is measured (step 67), along with an optional LCO amplitude measurement. After the LCO has been characterized, the transfer function of the ADC is restored to its normal operating state (step 68). Parameters of the converter are extracted from the measured LCO characteristics and the compensation parameters are computed or retrieved from a look-up table (step 69). Then, the new compensator is applied (step 70) until an event is detected indicating another auto-tuning cycle should be performed (decision 71), at which time all or part of steps 63 through step 71 are repeated until the power supply is shut down or the scheme is disabled (decision 72).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A switching power converter circuit, comprising:
   a magnetic storage element;
   a switching circuit coupled to the magnetic storage element for energizing the magnetic storage element;
   a capacitive storage element coupled to the magnetic storage element, wherein the capacitive storage element is charged by a current transferred from the magnetic storage element to provide an output terminal adapted for coupling to a load;
   a sensing circuit for sensing at least one of a current or a voltage provided at the output terminal;
   a control circuit having an input coupled to an output of the sensing circuit and an output coupled to the switching circuit, for controlling the switching circuit according to a feedback path from an output of the sensing circuit to an input of a modulator that controls the switching circuit, wherein the feedback path includes at least one digital element, and wherein the control circuit is responsive to a control signal to alter a transfer function of the at least one digital element within the feedback path to cause generation of a limit-cycle oscillation within the feedback path; and
   a limit-cycle oscillation measurement circuit for measuring characteristics of the limit-cycle oscillation, whereby characteristics of the switching power converter are obtained.

2. The switching power converter circuit of claim 1, wherein the limit-cycle oscillation measurement circuit includes a detector for determining whether or not the limit-cycle oscillation has occurred, and wherein the control circuit is further responsive to an output of the detector to further alter the transfer function of the at least one digital element if the detector detects that the limit-cycle oscillation has not occurred.

3. The switching power converter of claim 1, wherein the at least one digital element is the modulator, and wherein the modulator has a first quantization step that is smaller than or equal to a second quantization step of an analog-to-digital converter circuit that forms part of the feedback path when the control signal is de-asserted, wherein the analog-to-digital converter circuit has an input coupled to the output of the sensing circuit, and wherein the first and second quantization steps are quantization steps that are referenced to a particular circuit node of the switching power converter.

4. The switching power converter circuit of claim 1, wherein the at least one digital element is an analog-to-digital converter circuit and wherein a transfer function of the analog-to-digital converter circuit is altered in response to the control signal.

5. The switching power converter of claim 4, wherein in response to the control signal, a code corresponding to zero error in the feedback path is removed from the transfer function of the analog-to-digital converter.

6. The switching power converter circuit of claim 4, wherein the limit-cycle oscillation measurement circuit includes a detector for determining whether or not the limit-cycle oscillation has occurred, and wherein the control circuit is further responsive to an output of the detector to further alter the transfer function of the analog-to-digital converter circuit by removing additional codes if the detector detects that the limit-cycle oscillation has not occurred.

7. The switching power converter of claim 4, wherein in response to the control signal, a quantization step size of the analog-to-digital converter circuit is decreased to alter the transfer function of the analog-to-digital converter circuit.

8. The switching power converter of claim 1, wherein in response to the control signal, one code of the at least one digital element is removed from the transfer function.

9. The switching power converter of claim 1, wherein in response to the control signal, one or more bits at the at least one digital element are set to a fixed value.

10. The switching power converter of claim 1, wherein the control circuit alters the transfer function of the at least one digital element within the feedback path by replacing a first circuit block with a second circuit block in response to the control signal.

11. The switching power converter of claim 10, wherein the second circuit block is a single-bit element provided by a comparator, whereby the at least one digital element is a single-bit digital element when the control signal is asserted, and wherein the comparator has a threshold corresponding to zero error in the feedback path.

12. A method of operating a switching power converter, comprising:
    operating the switching power converter according to a feedback value generated from a sensed voltage or current of an output of the switching power converter and provided on a feedback path to a switching control circuit of the switching power converter;
    causing a limit-cycle oscillation in a control loop of the switch-mode power supply during the operating by selectively altering a transfer function of a digital portion of the feedback path in response to a control signal; and
    measuring characteristics of the limit-cycle oscillation to obtain parameters of the switch-mode power supply.

13. The method of claim 12, further comprising:
    detecting whether the limit-cycle oscillation has not occurred; and
    responsive to detecting that the limit-cycle oscillation has not occurred, further altering the transfer function of the digital portion of the feedback path.

14. The method of claim 12, wherein the selectively altering increases a quantization step of the switching control circuit, and wherein the modulator has a first quantization step that is smaller than or equal to a second quantization step of an analog-to-digital converter that forms part of the feedback path, and wherein the first and second quantization steps are quantization steps that are referenced to a particular circuit node of the switching power converter.

15. The method of claim 12, wherein the digital portion of the feedback path is an analog-to-digital converter, and wherein the selectively altering alters a transfer function of the analog-to-digital converter.

16. The method of claim 15, further comprising:
    detecting whether the limit-cycle oscillation has not occurred; and
    responsive to detecting that the limit-cycle oscillation has not occurred, further altering the transfer function of the analog-to-digital converter.

17. The method of claim 15, wherein the selectively altering removes a zero-error code from the transfer function of the analog-to-digital converter that corresponds to a zero-error condition in the feedback path.

18. The method of claim 17, wherein when the control signal is asserted, the output of the analog-to-digital converter generates a code adjacent to the zero-error code when a steady-state nominal input voltage is received at the input of the analog-to-digital converter, and wherein when the control signal is de-asserted, the analog-to-digital converter generates the zero-error code when the steady-state nominal input voltage is received.

19. The method of claim 15, wherein when the control signal is asserted, a quantization step size of the analog-to-digital converter is decreased.

20. The method of claim 12, wherein in response to the control signal, the selectively altering sets one or more bits of the digital portion of the feedback path to a fixed value.

21. The method of claim 12, wherein in response to the control signal, wherein the selectively altering selects between multiple circuit blocks implementing the digital portion of the feedback path.

22. The method of claim 21, wherein the selectively altering further selects between first one of the multiple circuit blocks and a second single-bit one of the multiple circuit blocks, and wherein the single-bit one of the multiple circuit blocks has a decision threshold substantially equal to a zero-error condition in the feedback path.

23. An integrated circuit for operating a switching power converter, comprising:
 an input for receiving a sense signal from an output of the switching power converter;
 an output controlling switching of the switching power converter;
 a control circuit providing feedback along a feedback path from the input to a modulator that sets states of the output according to a control response and having an input for receiving a signal commanding generation of a limit-cycle oscillation in the feedback, wherein a the control circuit alters a transfer function of a digital portion of the feedback path in response to the signal commanding generation of the limit-cycle oscillation.

24. The integrated circuit of claim 23, further comprising a detector for determining whether or not the limit-cycle oscillation has occurred, and wherein the control circuit is further responsive to an output of the detector to further alter the transfer function of the digital portion of the feedback path if the detector does not detect the limit-cycle oscillation.

* * * * *